United States Patent Office 3,775,394
Patented Nov. 27, 1973

3,775,394
PROCESS FOR THE ISOLATION AND PARTIAL PURIFICATION OF CALCITONIN
Claude D. Arnaud, Jr., Rochester, Minn., assignor to Research Corporation, New York, N.Y.
No Drawing. Continuation-in-part of application Ser. No. 740,028, June 26, 1968. This application July 14, 1971, Ser. No. 162,669
Int. Cl. C07c 103/52; C07g 7/00; C08h 1/00
U.S. Cl. 260—112.5                                    6 Claims

ABSTRACT OF THE DISCLOSURE

Relatively pure calcitonin is isolated from defatted animal tissue containing calcitonin-secreting cells by extraction with n-butanol-acetic acid-water, purification with silicic acid and subsequent gel filtration.

This application is a continuation-in-part of my earlier application Ser. No. 740,028, now abandoned, filed June 26, 1968.

This invention relates to an improved method for the isolation of calcitonin from defatted animal tissue containing calcitonin-secreting cells.

Calcitonin is a hypocalcemic, hypophosphatemic polypeptide principle extracted from defatted animal tissue containing calcitonin-secreting cells such as the thyroid glands and to a lesser extent the adrenal glands of mammals. Other tissues relatively high in calcitonin-secreting cell content are medullary carcinomas and the ultimobronchial glands of birds, amphibians and teleost fish, particularly salmon, chicken and turkey. The isolation, purification, structure determination and role of calcitonin as a hormone in the regulation of calcium and phosphate metabolism has been reviewed by Tenenhouse et al., Ann. Rev. Pharmacology, 8, 319 (1968).

It is the principal object of the present invention to provide a new and improved method for the extraction and partial purification of calcitonin from defatted animal tissue containing calcitonin-secreting cells.

The method of the present invention represents an improvement in the procedure reported by Tenenhouse, Arnaud and Rasmussen, Proceedings of the National Academy of Sciences, 53, 818 (1965). The present method is illustrated by comparison with that of Tenenhouse et al. in the extraction of calcitonin from porcine thyroid glands.

Freshly excised porcine thyroid glands were quick frozen in solid carbon dioxide and could be stored until required. The glands were defatted by grinding in the frozen state, lyophilization, repeated extraction with 5 times their volume of cold chloroform, and then once with cold acetone. The defatted powder was dried and stored at −15° C. until used for extraction of calcitonin.

The method of the present invention is illustrated by means of the chart below. The method can be scaled up and has been used successfully starting with a 8.0 kg. batch of defatted porcine thyroid powder and with other defatted animal tissues containing calcitonin-secreting cells.

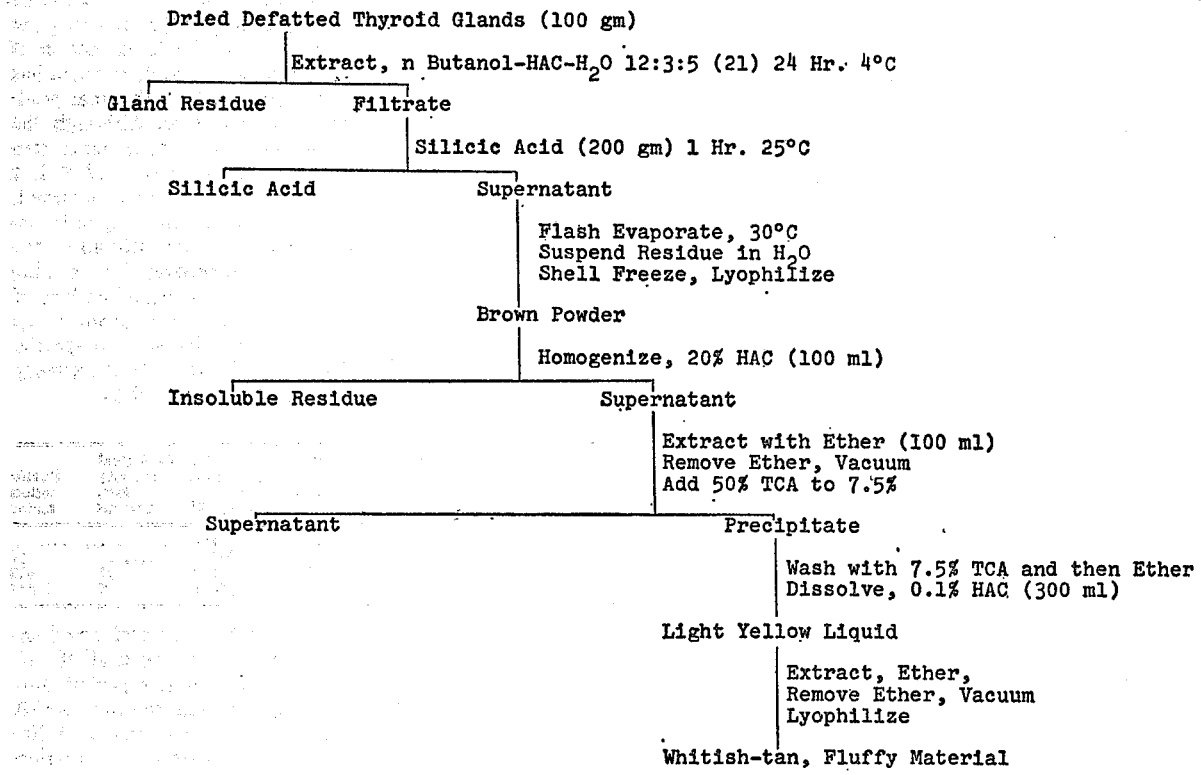

Dried, defatted porcine thyroid glands, 100 grams, are homogenized in a Waring blender for 0.5 to 1 minute with 2 l. of n-butanol-glacial acetic acid-water, 12:3.5. The mixture is mechanically stirred for 12–24 hours in the cold at about 4° C., then filtered under strong manual pressure through 3 layers of cheeese cloth. The gland residue is discarded. Silicic acid, 150–400 grams, (Bio Sil A 100–200 mesh) is then added to the dark brown filtrate and stirred mechanically for 1 hour at 25° C. The silicic acid, which has become tannish brown, is then removed by centrifugation. The n-butanol is removed by flash evaporation at 30° C. with frequent addition of water. The result of this procedure is a mass of dark brown material which is suspended in water, shell frozen and lyophilized. The dry, lyophilized brown powder is suspended in 100 ml. of 20% acetic acid and the mixture homogenized in a Virtis "45" homogenizer for 1 minute at "medium" setting. The mixture is centrifuged at 5000x g for 15 minutes and the supernatant removed by careful aspiration and saved (20% acetic acid extract No. 1). The dark brown residue is re-extracted with 300 ml. of 20% acetic acid (20% acetic acid extract No. 2). The resulting mixture is processed in the same way. Supernatants are translucent, deep yellow and depending upon the care with which centrifugation and aspiration are carried out, more or less free of fine particulate brown material. The two extracts are further processed in the same way, but separately.

Each extract is further extracted three times with equal volumes of ether and the residual ether removed by rotary vacuum evaporation. Trichloracetic acid, 50%, is then added slowly to each with mechanical stirring to a final concentration of 7.5%. A fine whitish-gray precipitate forms and this is collected by centrifugation at 5000x g for 15 minutes. The supernatant, which is translucent and yellow, is discarded. The precipitate is washed twice with 7.5 % trichloroacetic acid, once with a small amount of ether and then dissolved in 300 ml. of 0.1% acetic acid. The resulting solution is translucent and light yellow and is extracted with an equal volume of ether three times. Ether is removed by rotary vacuum evaporation and the solution shell frozen and lyophilized. The dry material is whitish-tan and fluffy.

Hypocalcemic activity of calcitonin was determined in 60–80 gram male Sprague-Dawley rats bred and raised at the Mayo Clinic and given a commercial low calcium diet for 1.5 to 3 days before they were used. Test materials and standard preparations were injected into the external jugular vein in 0.5 ml. volume of 1% bovine serum albumin in 20 mM. NaCl while the animals were lightly anesthetized with ether. Blood was obtained by cardia pucture 70 minutes later and the calcium concentration in the plasma measured by atomic absorption spectrophotometry within two hours. Specific biological activity is expressed in terms of MRC U/mg. weight or protein, Gudmundsson et al., Proc. Roy. Soc. (London) B164, 166 (1964). Protein was determined by the method of Lowry et al. J. Biol. Chem., 193 265 (1951).

The extraction procedure of Tenenhouse et al. is complex and tedious to perform. In contrast, the procedure of the present invention employing acid-alcohol extraction, batch-wise removal of contaminants with silicic acid and trichloroacetic acid precipitation is relatively simple to carry out. Of greatest importance, however, is that the present method results in a crude product which has specific biological activity from 10–20 fold greater and yields of approximately 2–3 times greater than that of Tenenhouse et al. This is shown in Table I below where the specific activities and yields of three separate extractions of aliquots of 200 grams of the same dried, defatted thyroid powders using the two procedures are compared. The data is based on the present product derived from the first extraction of the flash evaporated material with 20% acetic acid (acetic acid extract No. 1). However, an additional significant amount of activity can be obtained if this material is re-extracted with a larger volume of 20% acetic acid (acetic acid extract No. 2) and carried through the TCA precipitation step. The specific biological activity of this latter material is less, but still 4–5 times that of the Tenenhouse et al. product and represents an activity yield at least equal to that obtained in a single extraction of 200 grams of thyroid powder using the Tenenhouse et al. method. If the total yield of the present method is calculated on the basis of products of both acetic acid extracts, it approximates four times that of the prior art procedure.

TABLE I

| Extraction method | Yield (mg.) | Specific activity (MRC U/mg.) | Biological activity (MRC U) |
|---|---|---|---|
| Tenehouse et al | 900 | 0.4 | 360 |
| Do | 1,020 | 0.3 | 306 |
| Do | 920 | 0.4 | 368 |
| Average | 947 | 0.37 | 345 |
| Present method | 110 | 7.4 | 814 |
| Do | 105 | 8.0 | 840 |
| Do | 115 | 7.1 | 817 |
| Average | 110 | 7.5 | 824 |

Estimates of the biological activity contained in the product of each major step of the present extraction procedure are summarized in Table II. In these experiments, three aliquots of 50 grams of dried, defatted glands were separately but simultaneously carried through to one of 3 stages as indicated in the chart: Stage 1, filtrate after extraction of glands with n-butanol-acetic acid-water; stage 2, supernatant after extraction of contaminants with silicic acid and stage 3, lyophilized product. Stages 1 and 2 were treated identically. They were flash evaporated, lyophilized, homogenized with 20% acetic acid, extracted extensively with ether, and then relyophilized. Using the present procedure, it is striking that simple extraction of the glands with acid-alcohol produces a product which has a specific biological activity comparable to the final product of the Tenenhouse et al. procedure. Although the silicic acid batch-wise absorption of contaminants step leads to the greaest loss of biological activity (21%), a 7.5 fold concentration of biological activity is achieved, and without this step, the final product has a greatly decreased specific biological activity. (Practically all of the biological activity lost here can be recovered by eluting the silicic acid with water.) There is a negligible loss of biological activity between the silicic acid adsorption step and the final product, but a further increase in specific biological activity of 3.1 fold is achieved. Total recovery of biological activity has ranged from 50–80%.

TABLE II

| | Total protein (Lowry), mg. | Specific activity MRC U/mg. protein | Total biological activity MRC U | Biological activity lost, percent | Purification factor |
|---|---|---|---|---|---|
| Filtrate, saline extracted glands | 22,000 | 0.007 | 154 | | |
| Filtrate, alcohol-acid extracted glands | 857 | 0.4 | 342.8 | | 57 |
| Supernatant after silicic acid | 90 | 3.0 | 270.0 | 21 | 430 |
| Present extract | 27 | 9.4 | 254.0 | 6 | 1,340 |

The present procedure is a rapid, easily performed extraction and partial purification with silicic acid of calcitonin from defatted animal tissue containing calcitonin-secreting cells, particularly mammalian thyroid, which yields a product with a specific biological activity of 10–20 times that produced by previously described extraction procedures as well as a 2–3 fold greater yield. Subsequent gel filtration on porous polyacrylamide gels, as taught in the prior art, results in high yield of a product of purity approaching 60% on the first pass and better than 90% on the second pass. Other variations in the present procedure will suggest themselves to those skilled in the art and my invention is as claimed.

I claim:

1. A method for the isolation and partial purification of calcitonin which comprises extracting defatted tissue containing calcitonin-secreting cells with cold n-butanol-acetic acid-water 12:3:5, mixing the extract at room temperature with 75–100 parts by weight of silicic acid per 100 parts defatted tissue, separating the silicic acid, removing the n-butanol by evaporation, taking up the residue after evaporation in about 20% aqueous acetic acid at room temperature, extracting the aqueous acetic acid solution with ether at room temperature, and precipitating calcitonin from the aqueous acetic acid solution by the addition of trichloroacetic acid to a final concentration of about 7.5%.

2. A method according to claim 1 wherein the aqueous acetic acid solution is extracted with ether prior to the addition of trichloroacetic acid.

3. A method according to claim 1 wherein the calcitonin precipitate is dissolved in aqueous acetic acid, and and the solution extracted with ether at room temperature and then lyophilized.

4. A method according to claim 1 wherein the calcitonin isolated is further purified by gel filtration.

5. A method according to claim 1 wherein the defatted tissue is mammalian thyroid tissue.

6. A method according to claim 5 wherein the thyroid tissue is of porcine origin.

References Cited

UNITED STATES PATENTS

| | | | |
|---|---|---|---|
| 3,590,027 | 6/1971 | Grinnan et al. | 260—112.5 |
| 3,256,151 | 6/1966 | Copp et al. | 260—112.5 |

OTHER REFERENCES

Hawker et al.: Proc. Nat. Acad. Sci. US, 58, 1535 (1967).
Astwood et al.: J. Am. Chem. Soc., 73, 2969 (1951).
Rasmussen: J. Biol. Chem., 235, 3442 (1960).
Rasmussen et al.: J. Biol. Chem., 236, 1083 (1961).
Baghdiantz et al.: Nature, 203, 1027 (1964).

LEWIS GOTTS, Primary Examiner

R. J. SUYAT, Assistant Examiner

U.S. Cl. X.R.

260—112 T